United States Patent
Aota et al.

[11] Patent Number: 5,209,453
[45] Date of Patent: May 11, 1993

[54] LAMINATED TYPE PIEZOELECTRIC APPARATUS

[75] Inventors: Hiroyuki Aota; Masatoshi Kuroyanagi, both of Kariya, Japan

[73] Assignee: Nippondenso Co., Ltd., Kariya, Japan

[21] Appl. No.: 615,709

[22] Filed: Nov. 19, 1990

[30] Foreign Application Priority Data

Nov. 20, 1989 [JP] Japan .................................. 1-301578

[51] Int. Cl.$^5$ .................. F16K 31/02; F01L 9/02; F01L 9/04
[52] U.S. Cl. .................. 251/57; 251/129.06; 123/90.12; 123/90.13
[58] Field of Search ............. 251/57, 129.06; 123/90.12, 90.13

[56] References Cited

U.S. PATENT DOCUMENTS 4,762,300  8/1988  Inagaki et al. ................... 251/57 X

FOREIGN PATENT DOCUMENTS 63-62977  3/1988  Japan .
63-62978  3/1988  Japan .
1-156123  6/1989  Japan .

*Primary Examiner*—Arnold Rosenthal
*Attorney, Agent, or Firm*—Cushman, Darby & Cushman

[57] ABSTRACT

A piezoelectric apparatus includes a piezoelectric device which is biased by a fluid force instead of a spring. Since the fluid force can be maintained within a predetermined value even after the piezoelectric device has been used number of times, and since the fluid force can be modulated by fluid pressure providing means and valve means when the fluid force is decreased from the predetermined valve, the present piezoelectric apparatus can maintain the initial pressure on the piezoelectric device.

9 Claims, 3 Drawing Sheets

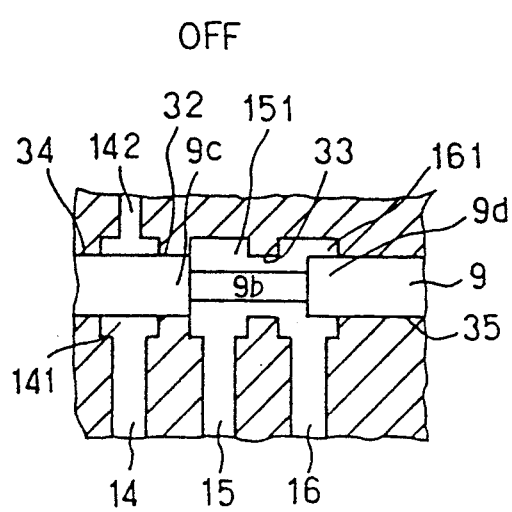
FIG.2(a) OFF
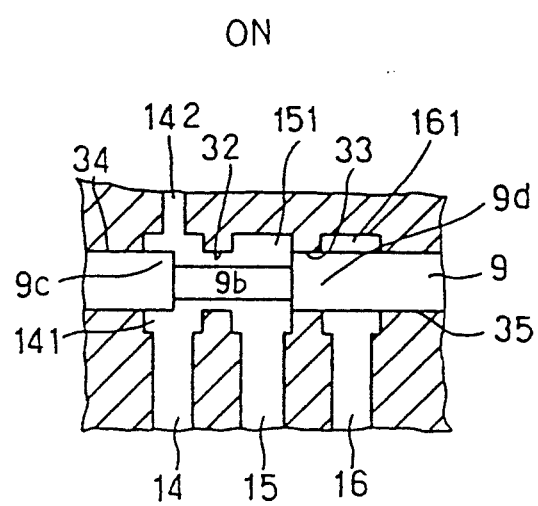
FIG.2(b) ON
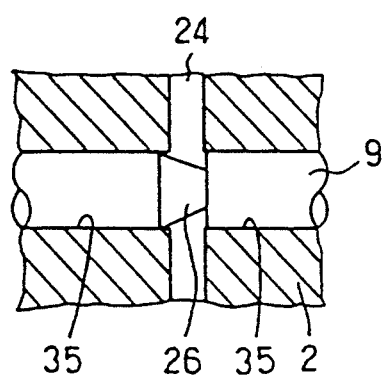
FIG.3(a)
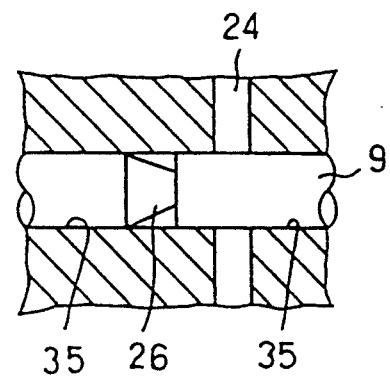
FIG.3(b)

LAMINATED TYPE PIEZOELECTRIC APPARATUS

FIELD OF THE INVENTION

This invention relates to a laminated type piezoelectric device.

BACKGROUND AND SUMMARY OF THE INVENTION

A conventional laminated type piezoelectric apparatus is described in Jap. Pat Laid-Open Publication No. 63-62977.

This laminated piezoelectric member is constituted such that the piezoelectric member is expanded or contracted by adding or eliminating a voltage across the piezoelectric member.

A valve means is then driven thereby by varying fluid pressure under this expansion or contraction.

However, piezoelectric devices have a small expansion. This can easily be absorbed by clearances in the device.

Due to this fact, in the prior art device, it is necessary to apply an initial load to the piezoelectric member. When the initial load is not applied or the applied load is insufficient, a generated load and an amount of expansion when the voltage is applied to the piezoelectric element are varied. This results is trouble in driving the valve means.

The conventional type of piezoelectric element disc spring has a large spring constant to apply such an initial load. The initial load is applied to the piezoelectric element by this disc spring.

However, the disc spring described above may have a variation in load, caused by its deterioration as it ages, resulting in a poor durability. In addition, because it is necessary to have a large spring constant, a size of the spring is made large and then an entire size of the liminated type piezoelectric element is increased.

The present invention has been invented in view of the aforesaid points and it is a object of the present invention to eliminate the spring means which has previously been necessary for applying the initial load.

According to the present invention, while voltage is applied to the piezoelectric member, a passage means to the driven means is closed by the valve means. With this arrangement, fluid from the fluid force acting means may apply a fluid force to the former passage means and the piezoelectric member is biased in a direction to press together the laminated plates. This direction is called the laminating or contracting direction. The fluid force is applied through the pressing member.

The fluid force of the fluid acting against the former passage means is held within the passage means by a means for holding the fluid force.

As a result, the pressing force of the piezoelectric member toward the laminating direction through the pressing member is maintained, and an applying of the initial load against the piezoelectric member is accomplished.

The passage means for the driven means is released by the valve means when the voltage is applied to the piezoelectric member and the fluid from the fluid force applying means may cause the fluid force to act on the passage means. As a result, the driven means is driven.

As described above, according to the present invention, it is possible to apply an initial load to the piezoelectric member using the fluid force instead of spring force for accomplishing the driving action of the driven means.

Accordingly, the load will not be unstable as found in case of a spring means due to deterioration due to aging, and a maintaining of a stable load can be attained. In addition, due to an applying of load by the fluid force, a uniform load in respect to the piezoelectric member can be attained.

BRIEF DESCRIPTION OF THE DRAWINGS

FIGS. 2(a) and 2(b) are sectional views for showing an enlarged controlled part of the spool valve shown in FIG. 1.

FIGS. 3(a) and 3(b) are sectional views for showing a relation between the tapered part of the spool valve and the passage of FIG. 1.

DETAILED DESCRIPTION OF THE PREFERRED EMBODIMENT

Figure 1:
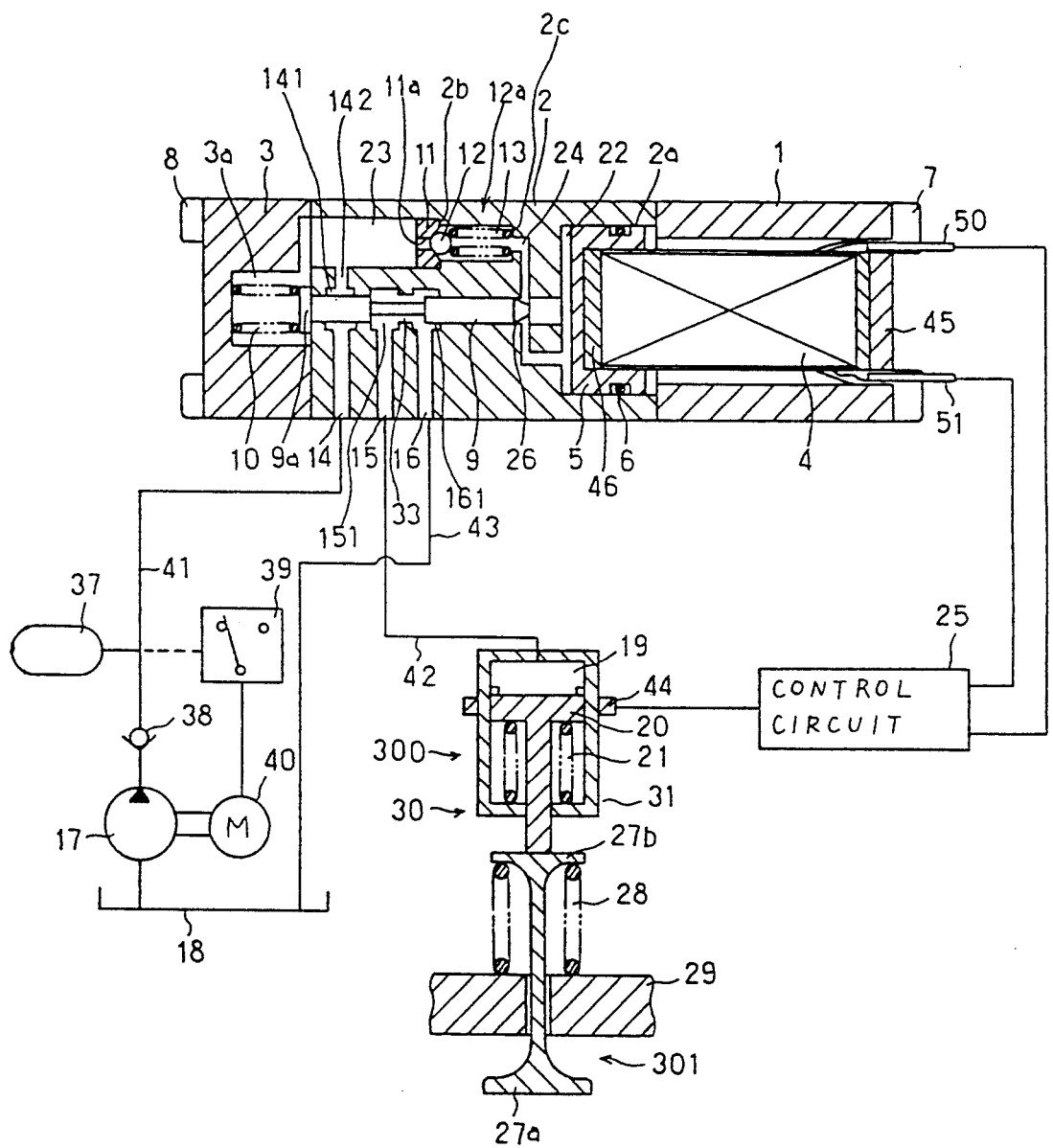
FIG. 1 is a sectional view for showing one preferred embodiment of the present invention when the holder is shown in axial cross-section.

Some preferred embodiments of the present invention will now be described in detail referring to the drawings.

FIGS. 1 to 3(a) and 3(b) show a laminated piezoelectric device of the present invention which is constituted in general by a holder 1 for storing a piezoelectric member, a housing 2 storing a spool valve or the like, a spring holder 3 storing a coil spring and an intake valve device 30 forming a driven means.

The holder, 1 has a cylindrical shape for enclosing a side part and one end of the laminated piezoelectric member 4 which is stored in the holder 1.

The piezoelectric member 4 is a well-known type in which several disk-like piezoelectric elements are laminated together to form a tubular shape and have electrodes at its front and rear surfaces. The piezoelectric elements are connected in parallel across a voltage source in such a way that a voltage is applied to each of the piezoelectric elements.

Electrical feeding terminals 51 and 52 are connected to the piezoelectric element 4 for use in supplying a voltage. The terminals 51 and 52 are connected to a control circuit 25 to be described later, to receive a voltage signal therefrom.

A laminating member 45 is placed between one and of the piezoelectric element 4 and one end of the holder 1 and is composed of electrical insulating plates and metallic plates. The laminating member 45 is integrally formed through the piezoelectric element 4 and a thermal shrinkage tube, and the metallic plate of the laminating member 45 faces against the holder 1.

One end of the housing 2 is formed with a cylindrical concave part 2a in which the other end of the piezoelectric element 4 is stored through a hydraulic piston 5. The hydraulic piston 5 has a section shaped like a "C" with three sections meeting a tight angles and its outer surface and inner surface are formed into a circular surface in radial crosssection. The hydraulic piston 5 is freely fitted to the other end of the piezoelectric element 4 through the laminating member 46. The laminating element 46 has a configuration similar to that of the aforesaid laminating member 45 and its metallic plate faces against the hydraulic piston 5.

The hydraulic piston 5 is slidably stored in the concave part 2a of the housing 2. The hydraulic piston 5 maintains an oiltight state within the concave part 2a of the housing 2 using an O-ring 6 formed of a resilient material, arranged at an outer surface of the hydraulic piston.

The housing 2 is formed with an oiltight chamber 22 forming a chamber made between the concave part 2a and the hydraulic piston 5. The volume of the oiltight chamber 22 is varied as the hydraulic piston 5 changes its positions. The oiltight chamber 22 is in communication with an oiltight passage 24, which is connected to an oil accumulator 23 having a larger diameter than that of the oiltight passage 24 and is in communication with the end part of the housing 2 through check valve 12a acting as the hydraulic pressure holding means or closing means.

Check valve 12a is constituted by a valve seat 11 having an opening 11a at its central part, a spherical valve member 12 and a coil spring 13. The valve seat 11 is fastened into at the accumulation part 23 at a position set at an inner stage 2b of the housing 2. The spring 13 is installed between a step part 2c formed within the housing 2 at the check valve part and the valve member 12 so as to press the valve member 12 against the valve seat 11.

The housing 2 is formed with a first passage 14, a second passage 15 and a third passage 16, respectively.

The first passage 14 passes from the side part of the housing 2 through its inner side and is in communication with the oil accumulation part 23 through a large diameter passage-like changing-over part 141 and a small diameter passage part 142.

The second communication part 15 is communicated with a large diameter passage-like changing-over part 151 form the side part of the housing 2 through its inner part.

The third communication part 16 is similarly communicated with a large diameter changing-over part 161 from the side part of the housing 2 through its inner part.

A communicating passage 32 is formed between each of the changing-over portions 141 and 151. The changing-over portions 151 and 161 are communicated to each other by the communicating passage 33.

Each of the changing-over portions 141, 151 and 161 has the same diameter. Each of the communication passages 32 and 33 have the same diameter and these elements 32, 33, 141, 151 and 161 are coaxially arranged.

A spool valve 9 acting as the valve means and having a circular section is passed from the other end of the housing 2 into its interior part. The spool valve 9 is inserted into the sliding portions 34 and 35 formed at the housing 2 with each of the communication passages 32 and 33 being applied as guides. The sliding part 34 is communicated with the outside part of the housing 2 and with the changing-over portion 141. The sliding portion 36 is communicated with the changing-over portion 161 and the concave part 2a of the housing 2.

A flange part 9a of one end of the spool valve 9 is abutted against an outside part 2f of the housing 2 and the other end of the spool valve is extended into the concave part 2a of the housing 2. All parts of the spool valve 9 have a smaller diameter than changing-over part 141, changing-over part 151 and changing-over part 161 so that fluid flow can continue even when the spool valve is located in 141, 151, or 161. However, the small-diameter portions 32,33 are the same size as controller portions 9c and 9d acting as an opening or closing means between passages 14, 15d, 16.

FIGS. 2a and 2b show change-over of communicating state between the change-over portion 141 and the change-over portion 151 as controlled by the controlling part 9c and the small diameter part 9b of the spool valve 9. A communicating state between the changing-part 151 and the changing-over part 161 is changed over and controlled by the controlling part 9d and the small diameter part 9b of the spool valve 9.

The passage 35, in which the spool valve 9 is slidable, is communicated with and crosses the oiltight passage 24. A portion of the spool valve 9 is formed with a tapered portion 9a acting as a releasing part over its circumferential direction at a position corresponding to the crossed portions. The tapered portion 9e has a function to change-over a communication and a shielding between the oiltight chamber 22 and the oiltight passage 24.

A spring holder 3 is arranged at at the other end of the housing 2. Within the concave part 3a formed in the holder 3 is arranged a coil spring 10 for applying a spring load to flange part 9a of the spool valve 9. The concave part 3a is communicated with the oil accumulation part 23.

The holder 3 and the housing 2 are fixed by bolts 8. The housing 2 and the holder 1 are fixed by bolts 7 and they are integrally formed into a structure.

The first passage 14 is connected to a drain pan 18 storing oil therein through an accumulator 37, a hydraulic pipe 41, a hydraulic pump 17 and a check valve 38. In turn, the second passage 15 is connected to an intake valve device 30 through the hydraulic pipe 42. The third passage 16 is connected to the drain pan 18 through the hydraulic pipe 43 so as to form the drain passage.

Hydraulic pressure within the accumulator 37 is monitored by a pressure switch 39 arranged within the accumulator 37. As oil is consumed due to oil leakage and a driving of the intake valve device 30, the hydraulic pressure within the accumulator 37 is lowered, when it becomes lower than a set pressure, the pressure switch 39 is closed, a motor 40 for the hydraulic pump 17 is driven and then oil is supplemented in the accumulator 37.

The intake valve device 30 is constituted by a hydraulic operating part 300 and an intake valve 301 arranged within each of the cylinders of the internal combustion engine.

The hydraulic operating part 300 is constituted of a casing 31, a piston 20 arranged within the casing 31 in such a way as it may be moved up and down, a hydraulic chamber 19 formed between the piston 20 and the casing 31 and a coil spring 21.

In turn, a valve 27a of the intake valve 301 is arranged within the cylinder head housing 29 in each of the cylinders. An end part 27b projecting out of the cylinder head housing 29 is abutted against an end part of the piston 20. The intake valve 301 is driven by the piston 20. The coil spring 28 installed between the piston 20 and the cylinder head housing 29 is applied for use in returning the intake valve 301 to a normal position.

Control circuit 25 for use in driving the piezoelectric member 4 will now be described.

The preferred embodiment may control an opening or closing timing for the intake valve 301 for use in controlling an output of the internal combustion engine by adjusting an amount of intake mixture for the internal combustion engine. In order to accomplish this control-over of opening or closing timing, a position of the piston 20 of the hydraulic driving part 300 of the aforesaid intake valve 301 is detected by a well-known differential transformer 44 and the detected signal is inputted to the control circuit 25. Signals indicative of ignition time and a rotational speed of the internal combustion engine are also inputted to the control circuit 25.

The control circuit 25 may generate a driving output signal of the intake valve 301 in response to these input signals. For example, when a driving signal of the intake valve 301 is produced, a voltage (600 V) is applied to the piezoelectric member 4. Alternatively, when a non-driving signal for the intake valve 301 is generated, the voltage for the piezoelectric member 4 is released (goes to 0 V).

The driving of the spool valve 9 is controlled by the driving and non-driving signals of the intake valve 301.

That is, when the driving signal for the intake valve 301 is generated, the piezoelectric member 4 expands under an application of the voltage, resulting in the hydraulic piston 5 sliding in the concave part 2a of the housing 2. A volume of the oiltight chamber 22 is reduced and a hydraulic pressure in it is increased. This causes the spool valve 9 to be driven into the state shown in FIG. 2(b) under the influence of the increased hydraulic pressure within the oiltight chamber 22. A space 32 between the first passage 14 and the second passage 15 is communicated and released, and a space 33 between the second passage 15 and the third passage 16 is closed.

In turn, when the non-driving signal for the intake valve 301 is generated, the applying of the voltage to the piezoelectric member 4 is released, so that the piezoelectric member 4 is contracted and the spool valve 9 is returned back to the state shown in FIGS. 1 and 2(a) by a returning spring 10. As a result, space 32 between the first passage 14 and the second passage 15 is shielded and closed and further space 32 between the second passage 15 and the third passage 16 is c communicated and released.

With the aforesaid configuration, the operation of the present invention will be described, and specifically a process for applying an initial load for the piezoelectric member 4 will first be described.

Since the applying of voltage for the piezoelectric member 4 is being released, the spool valve 9 is kept at a state shown in FIG. 1 and the changing-over part 32 is closed by the control part 9c for the valve 9 as shown in FIG. 2(a).

The hydraulic pump 17 is driven and high pressure oil is fed into the accumulator 37. The high pressure oil in the accumulator 37 enters from the first passage 14 into the housing 2 and reaches the oil accumulation part 23 through the changing-over portion 141 and the passage 142.

The valve body 12 of the check valve 12a is opened until a pressure difference between the oiltight passage 24 and the oil accumulation part 23 is eliminated, and then the high pressure oil flows into the oiltight passage 24. In this case, since the spool valve 9 is kept at the state shown in FIG. 1, the tapered part 9e of the valve is placed at the crossing part of the oiltight passage 24, and the high pressure oil entering the oiltight passage 24 can pass through the tapered part 9e and flow into the oiltight chamber 22.

The high pressure oil flowing into the oiltight chamber 22 pushes the hydraulic piston 5 toward the laminating direction of the piezoelectric member 4 and thus the load of the hydraulic oil is applied to the piezoelectric member 4.

When the differential pressure between the oil-tight passage 24 and the oil accumulation part 23 is eliminated the valve body 12 of the check will abut against the valve seat 11 to cause the check valve to close. The high pressure oil is enclosed in the oiltight chamber 22 and the oiltight passage 24, and a high pressure state is kept within the oiltight chamber 22 and the oiltight passage 24. With this arrangement, an initial load is applied to the piezoelectric member 4.

The initial load for the piezoelectric member 4. completed if a oil pressure within the accumulator 37 is more than a specified valve. This valve is determined by the pressure switch 38.

The driving method for the intake valve device 30 will now be described.

When a driving signal for the intake valve 301 is produced from the control circuit 25, a high voltage of 600 V is applied to the piezoelectric member 4. This causes the piezoelectric member 4 to expand so that the hydraulic piston 5 slides leftward in the concave part 2a of the housing 2. A volume of the oiltight chamber 22 is thereby reduced, causing the hydraulic pressure to increase. With this arrangement, the spool valve 9 may be influenced by the increased hydraulic pressure within the oiltight chamber 22 and driven into the state shown in FIG. 2 (b) against the spring load of the returning spring 10. The control part 9c of the spool valve 9 is moved away from the position of the communication passage 32 to release the communication passage 32. In turn, the control part 9d of the spool valve 9 is positioned at a location of the communication passage 33 to close the changing-over portion 33. In turn, the communication between the tapered part 9e of the spool valve 9 and the oiltight passage 24 is shielded.

With this arrangement, the first passage 14 and the second passage 15 are communicated to each other and released to each other and communication between the second passage 15 and the third passage 16 are closed.

Due to this fact, the high pressure oil entering the first passage 14 through the changing-over portion 141—communication passage 32—changing-over portion 151—the second passage 15 and further flows into the oil chamber 19 of the intake valve device 30. Accordingly, the piston 20 is pushed by the oil pressure and the intake valve 27 is opened.

When the non-driving signal of the intake valve 301 is generated from the control circuit 25, the applying of voltage to the piezoelectric member 4 is terminated the causes the piezoelement to contract and therefore oil pressure in oiltight chamber 22 to decrease. Since the oil pressure within the oiltight chamber 22 is decreased, the spool valve 9 is returned back to the position show in FIG. 1 by the returning spring 10. Thus, the control part 9c for the spool valve 9 may close the communication passage 32 and in turn the control part 9d of the spool valve 9 is moved away from the communication passage 33 and releases the communication passage 33.

As a result, the second passage 15 and the third passage 16 are communicated with each other the oil pressure within the oil pressure chamber 19 of the intake valve device 30 is decreased, the piston 20 is returned by the returning spring 21 and the suction valve 27 is closed.

In this way, although the interior of the oiltight chamber 22 is always filled with high pressure oil, its high pressure oil can slightly lead leak through a slight clearance between the sliding part 35 of the housing 2 and the spool valve 9 to the third passage 16.

In the preferred embodiment, a mechanism for supplementary charging the oil of leakage is provided. This mechanism will be described.

A voltage should not be applied to the piezoelectric element 4 unless it is completely contracted. However since the spool valve 9 is formed with a tapered part 26, a detection can be made when the tapered part 26 of the spool valve 9 is returned back to the state shown in FIG. 1 and 3(a) to determine complete contraction of the piezoelectric element. That is, when the piezoelectric member 4 is completely contracted, the oiltight chamber 22 and the oil passage 24 are communicated to each other through the tapered part 26. This returned position of the spool valve 9 can be determined by sensing that the piston 20 has returned back to its normal position which happens when the chamber 22 communicates with the passage 24. The different transformer 44 arranged in the casing 31 of the intake valve device 30 senses the position of piston 20.

Accordingly, under such a condition as above, it is possible to drive the hydraulic pump 17 and supplementarily fill the high pressure oil to the oiltight chamber 22.

Under this condition where a voltage is applied to the piezoelectric member 4, if supplemental oil is supplied, the spool valve 9 may not be returned back through the supplementarily filled pressure within the oiltight chamber 22 when the applying of voltage to the piezoelectric member 4 is stopped. That is, if the supplementary supplying of oil is faster than the returning of the spool valve, the spool valve 9 may not be returned under an increased hydraulic pressure within the oiltight chamber 22.

However, in the preferred embodiment, as described above, when the spool valve 9 is returned back to the state shown in FIGS. 1 and 3(a) by the returning spring 10, that is when the applying of voltage to the piezoelectric member 4 is stopped, the oiltight chamber 22 and the oil passage 24 are communicated through the tapered part 26 of the spool valve 9. With this arrangement, after the spool valve 9 has returned back to the normal position positively, it becomes possible to supply supplemental oil and thus the aforesaid dangerous state where the spool valve is not returned, may be avoided.

Since the aforesaid oil leakage may influence against the oil pressure within the accumulator 37, if the oil pressure within the accumulator 07 is decreased, the hydraulic pump 17 is driven through the pressure switch 39 and then the high pressure oil is automatically supplemented in the oiltight chamber 22.

Figure 4:
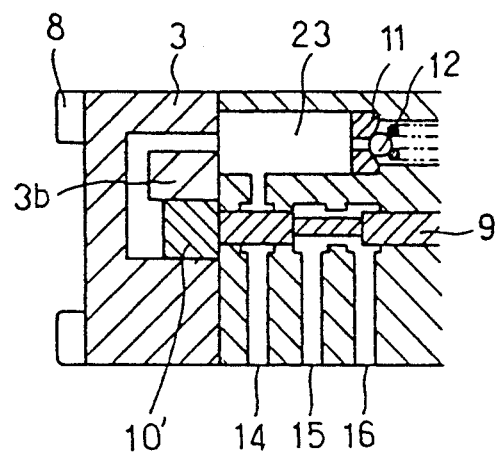
FIG. 4 is a sectional view for showing a substantial part of another preferred embodiment of the present invention.

FIG. 4 shows a modification of the embodiment, where in place of the coil spring 10' for use in returning the spool valve 9, a piston 10' having a larger cross sectional area as compared with that of the spool valve 9 is applied. The piston 10' is integrally fixed to the end part of the spool valve 9 and the piston 10' is slidably held between the inner wall of the holder 3 and a guiding wall 3b formed inside the holder 3.

In the preferred embodiment, since the concave part 3a of the holder 3 is communicated with the oil accumulation part 23, a force in which a difference of sectional area between the spool valve 9 and the piston 10' is multiplied by the oil pressure within the oil accumulation part 23 may act against the and part of the piston 10' and then the position of the spool valve 9 is returned back to its original position. Accordingly, the piston 10' may perform action similar to that of the returning coil spring 10 for the spool valve 9 of FIG. 1.

Figure 5:
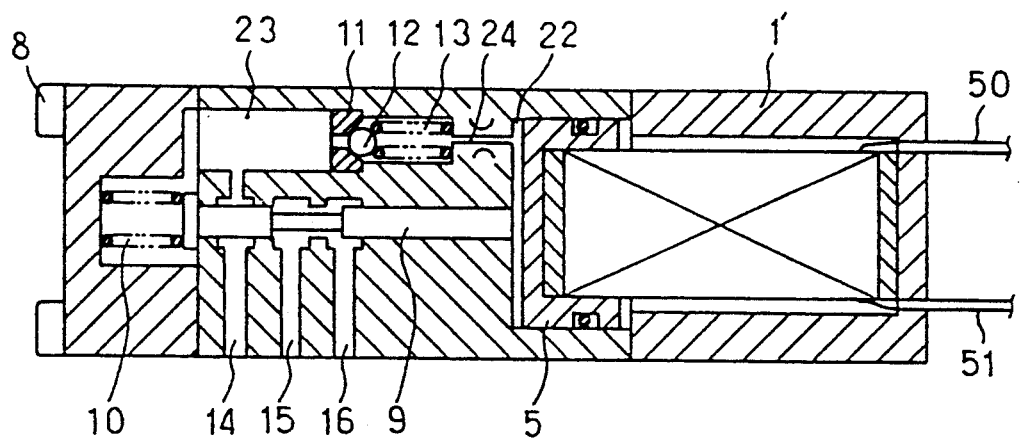
FIG. 5 is a sectional view for showing a still further preferred embodiment of the present invention.

FIG. 5 illustrates another preferred embodiment of the present invention in which the tapered part 26 of the spool valve 9 in FIG. 1 is eliminated and the oiltight passage 24 is of an orifice structure.

In this preferred embodiment, it is necessary to set an orifice diameter of the oiltight passage 24 in such a way as the check valve does not open until the position of the spool valve 9 is returned back to its original position. This is due to the fact that the returning of the spool valve 9 to its normal position of the spool valve 9 under a fast supplementing action of oil into the oiltight chamber 22 as compared with the returning of the spool valve 9 is not prevented from being performed.

The present invention is not limited to the aforesaid preferred embodiments, but various modifications described below may also be used.

(1) Although a mechanical check valve is used as means for enclosing the hydraulic pressure within the oiltight chamber 22 and the oiltight passage 24, an electromagnetic check valve, for example, may also be used.

(2) Although the spool valve 9 acting as means for controlling a supplying of oil to the first passage 14 and the second passage 15 is formed with the tapered part 26 as the closing means for opening or closing the oiltight chamber 22, it is not limited to the tapered part 26, but the spool valve 9 may be formed with a through-hole so as to open or close the oiltight passage 24.

(3) Although as the driven means, the intake valve device 30 has been employed, various means may be devised and for example it may be applied to the suspension mechanism of the vehicle.

We claim:

1. A piezoelectric apparatus comprising:
   a piezoelectric device expanded by applying a voltage to said piezoelectric device and contracted when said voltage is removed;
   a fluid pressure providing means for providing a fluid with a fluid force, which comprises a pump to pressurize said fluid, an accumulator to accumulate said pressure and maintaining means for maintaining said pressure in said accumulator by controlling said pump;
   a first passage means for guiding said fluid force of said fluid to press said piezoelectric device toward a contracted direction thereof;
   driven means driven by a pressure of said fluid force of said fluid;
   a second passage means for providing said fluid force of said fluid to said driven means;
   valve means for opening said first passage means and shutting said second passage means, when said piezoelectric device is contracted by eliminating a voltage, and for shutting said first passage means and opening said second passage means, when said piezoelectric device is expanded by applying a voltage; and check valve means provided between said fluid pressure providing means and said first passage means, for maintaining said fluid force of said fluid in said first passage means when a voltage is applied to said piezoelectric device to open said second passage means.

2. A piezoelectric apparatus according to claim 1, wherein said check valve means is provided between said valve means and said first passage means for maintaining said fluid force of said fluid in said first passage means when a voltage is applied to said piezoelectric device and includes a valve seat, valve means, and means for biasing said valve means toward said valve seat.

3. A piezoelectric apparatus according to claim 1, wherein said driven means is an intake valve device with a valve thereof that is moved by said fluid force.

4. A piezoelectric apparatus according to claim 1, wherein said valve means further comprises return means for returning said valve means when said piezoelectric device is contracted, and means for receiving said fluid force so that said valve means is moved by increasing said fluid force.

5. A piezoelectric apparatus comprising:
   a piezoelectric device expanded by applying a voltage to said piezoelectric device and contracted when said voltage is removed;
   a fluid pressure providing means for providing a fluid with a fluid force;
   a first passage means for guiding said fluid force of said fluid to press said piezoelectric device toward a contracted direction thereof;
   driven means driven by a pressure of said fluid force of said fluid;
   a second passage means for providing said fluid force of said fluid to said driven means;
   valve means for opening said first passage means and shutting said second passage means, when said piezoelectric device is contracted by eliminating a voltage, and for shutting said first passage means and opening said second passage means, when said piezoelectric device is expanded by applying a voltage; and
   check valve means provided between said fluid pressure providing means and said first passage means, for maintaining said fluid force of said fluid in said first passage means when a voltage is applied to said piezoelectric device to open said second passage means, wherein a pressure of a part of said second passage means leading to said driven means is atmospheric pressure when said second passage means is shut by said valve means.

6. A piezoelectric apparatus according to claim 5 further comprising third passage means, connected to said second passage means through said valve means wherein said third passage means is at atmospheric pressure when said second passage means is shut.

7. A piezoelectric apparatus according to claim 5, wherein said valve means includes means for opening said second passage means when said fluid force of said fluid is increased by said piezoelectric device expanding, and return means for closing said second passage means when said piezoelectric device is contracted.

8. A piezoelectric apparatus according to claim 7, wherein said return means is a return spring.

9. A piezoelectric apparatus according to claim 7, wherein said return means is said fluid force of said fluid.

* * * * *